REFILL HOSE MOUNTING CLIP

Filed June 23, 1966

INVENTORS
ADOLF SCHOEPE,
FREDRIC E. SCHMUCK
BY
MAHONEY & HORNBAKER
ATTORNEYS 3,319,913
REFILL HOSE MOUNTING CLIP
Adolf Schoepe, 1620 N. Raymond Ave., Fullerton, Calif. 92631, and Frederic E. Schmuck, 535 Century Drive, Anaheim, Calif. 92805
Filed June 23, 1966, Ser. No. 559,778
7 Claims. (Cl. 248—75)

This invention relates to a refill hose mounting bracket or clip adapted to secure the discharge extremity of a refill hose in operative relationship with the associated upper extremity of the refill tube of a conventional toilet flush tank.

These refill hoses are usually formed of one of the common resilient materials and although various expedients have been utilized to secure the extremities of the hoses in operative relationship with associated refill tubes, such prior art devices have not been entirely satisfactory because of various problems encountered in their utilization. Among such problems are the collapse of the discharge extremity of the refill hose which, of course, results in the inadequate discharge of refill water into the overflow tube and prevents the maintenance of the proper water level in the bowl of the associated toilet.

Another problem encountered with these prior art hose clips is occasioned by the fact that during the discharge of refill water from the refill hoses, there is a tendency for the hoses to whip away from proper alignment with the overflow tube. Unless such proper hose alignment is maintained with the overflow tube, the same failure can occur, that is, an inadequate discharge of refill water from the hose into the overflow tube for the proper functioning of the associated toilet.

This problem can be of a two pronged nature. First, the extremity of the hose must be tightly gripped in order to resist this whipping action. Second, the hose clip must securely grip the overflow tube in order to prevent this whipping tendency from dislodging the hose clip from the tube or movement of the hose clip on the tube.

It is, therefore, an object of our invention to provide a mounting clip for a refill hose which is operatively connected with the discharge extremity of the refill hose in such a manner as to prevent the collapse thereof. This mounting clip is adapted to maintain said discharge extremity in a distended condition, thus positively preventing the collapse of said discharge extremity.

Another object of our invention is the provision of a mounting clip for a refill hose which may be formed as a unitary body having a hose engaging portion disposable within the interior of the discharge extremity of the refill hose, said hose engaging portion having dimensions larger than the interior diameter of the hose so as to frictionally engage the hose interior and securely retain the hose extremity. This hose engaging portion may include a cylindrical part disposed interiorly of the hose extremity with this cylindrical part being provided with a slot axially therethrough. Thus, the radius or diameter of this cylindrical part may be selectively increased or decreased so as to increase or decrease the hose discharge extremity and thereby control the velocity at which the refill water is discharged from said discharge extremity.

An additional object of our invention is the provision of a mounting clip for a refill hose having the foregoing axially slotted cylindrical part disposable within the interior of the hose discharge extremity wherein the cylindrical part is flared outwardly at the slot lower extremities so as to provide positive angular detent means adapted to engage the adjacent areas of said refill hose discharge extremity. In this manner, this positive detent means, particularly in combination with the expansion of the hose discharge extremity by this cylindrical part, positively retains the hose discharge extremity in operative relationship with the overflow tube.

Still a further object of our invention is the provision of a mounting clip for a refill hose which may be formed with an overflow tube mounting portion having an interior part disposed for engagement with the interior of the refill tube and an exterior part provided with inwardly projecting spaced dogs for positively engaging the exterior of the overflow tube. This exterior part of the tube mounting portion may be formed hook-shaped so as to terminate downwardly in an inwardly extending leg, such leg presenting an inner end surface. The spaced dogs may be formed on this leg inner end surface by forming the leg bifurcated so as to present laterally spaced dogs engageable with the exterior of the overflow tube.

Other objects and advantages of the invention will be apparent from the following specification and the accompanying drawing which is for the purpose of illustration only, and in which.

Figures 1, 3, 5:
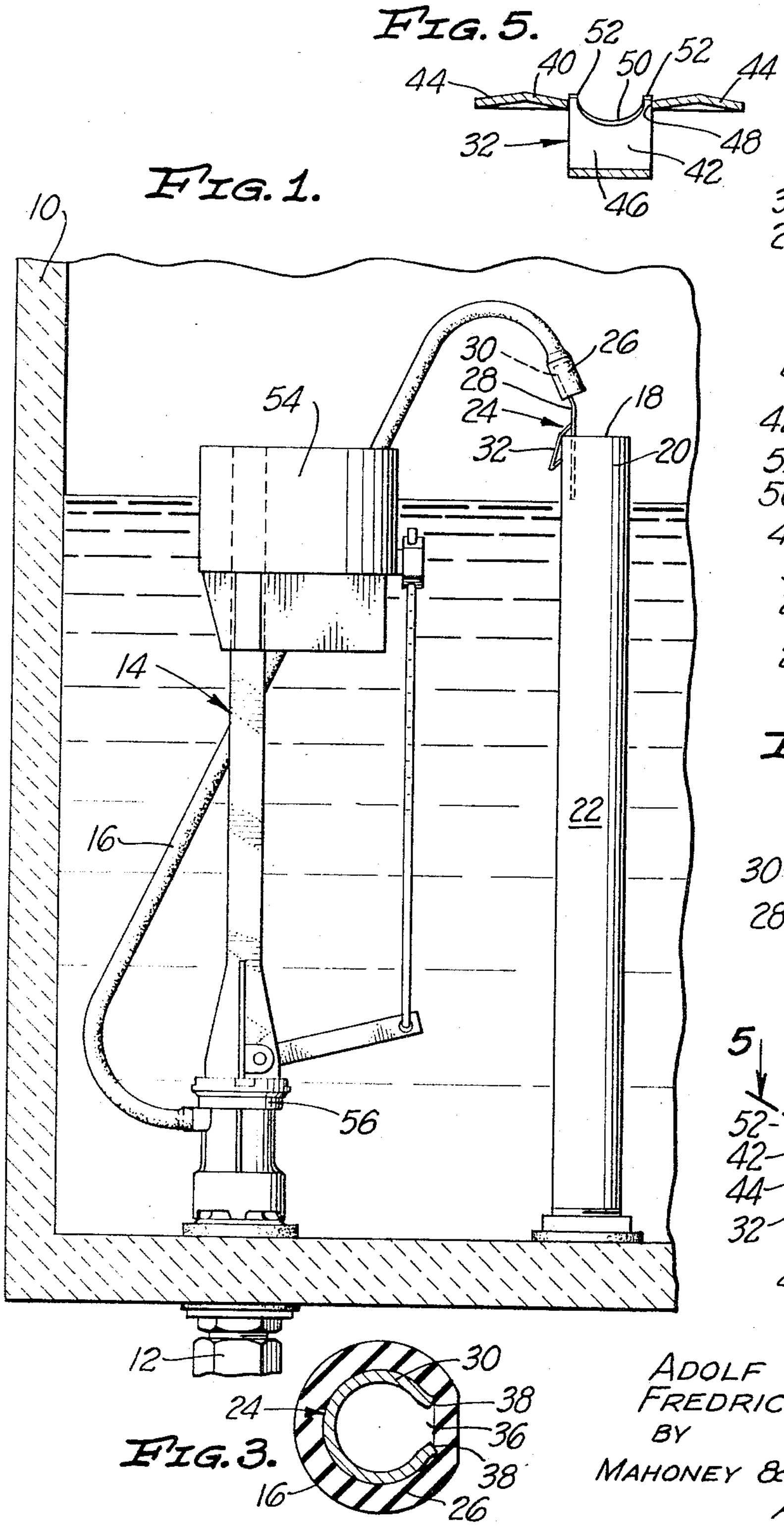
FIG. 1 is a fragmentary, vertical, sectional view of a toilet flush tank having a ball cock assembly and refill tube, shown in side elevation, operatively mounted therein, and also showing an embodiment of the refill hose mounting clip of the present invention retaining the discharge extremity of a refill hose on the upper extremity of the overflow tube properly oriented with respect to said tube.
FIG. 3 is an enlarged, sectional view taken along the broken line 3—3 in FIG. 2.
FIG. 5 is an enlarged, sectional view taken along the broken line 5—5 in FIG. 4.

Referring to the drawing, an embodiment of the refill hose mounting clip incorporating the principles of the present invention is shown associated with a conventional toilet flush tank 10 having the water inlet pipe 12 operably connected in communication with a unique form of ball cock generally indicated at 14 for controlling the flow of water into the flush tank and through the refill hose 16 into the opening 18 at the upper extremity 20 of an overflow tube 22. As stated, the ball cock 14 is of a unique form, but does not form a part of the invention of the present application, being separately described and claimed in our copending applications, Ser. No. 559,779 entitled, "Ball Cock," Ser. No. 559,772 entitled, "Ball Cock Float," and Ser. No. D. 2,796 entitled, "Design for Ball Cock," all filed on an event date herewith For purposes of the present description, it may be assumed that the ball cock 14 operates in the conventional manner for controlling the flow of water from the water inlet pipe 12 into the flush tank 10 and simultaneously through the refill hose 16 into the overflow tube 22.

All of the other components shown may be of standard construction, with the exception of the refill hose mounting clip 24 of the present invention, which serves the function of retaining the outlet extremity 26 of the refill tube 22 properly positioned for directing water into the upper extremity opening 18 of the overflow tube 22. Furthermore, the fact that the mounting clip 24 is shown in this particular associated environment is not intended to limit the principles of the present invention, but rather it should be understood that the principles of the present invention are clearly applicable to other forms of flush tank assemblies and will function in a similar manner as described below.

The mounting clip 24 illustrated is formed of a non-corrosive material, preferably stainless steel, and includes a unitary body 28 having the hose engaging portion 30 integral with the tube mounting portion 32. Further, the hose engaging portion 30 is angled relative to the tube mounting portion 32 so as to position the hose extremity 26 angled slightly relative to the overflow tube upper extremity 20. As is well known in the art, the noise of water flow is an extreme problem and this angling of the hose engaging and tube mounting portions 30 and 32 will position the refill hose 16 relative to the overflow tube 22 so that the stream of water from the hose will be directed angularly against the side wall 34 of the overflow tube so as to reduce this problem.

Figure 2:
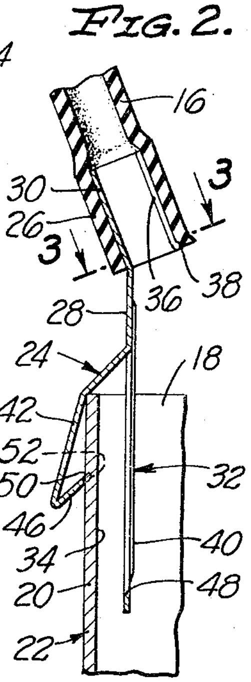
FIG. 2 is an enlarged, fragmentary, vertical, sectional view of the refill hose discharge extremity, the refill hose mounting clip and the overflow tube upper extremity.
Figure 4:
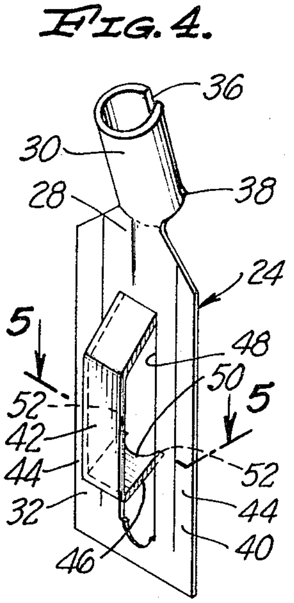
FIG. 4 is an enlarged, perspective view of the embodiment of the refill hose mounting clip removed from the refill hose and overflow tube.

Referring more particularly to FIGS. 2 and 4, the hose engaging portion 30 is formed hollow cylindrical, having the slot 36 extending axially therethrough, and the outer dimensions of this hose engaging portion are slightly larger than the internal diameter of the outlet extremity 26 of the refill hose 16 so that this hose extremity may be expanded over the hose engaging portion and will retain this hose engaging portion therein with a pressure fit, hose 16 being formed of a usual resilient material. In view of the slot 36 being formed axially through this hose engaging portion 30, the dimensions of this hose engaging portion may be increased or decreased as desired so as to increase or decrease the outlet opening of the refill hose 16. In this manner, the flow of water from the refill hose 16 into the overflow tube 22 may be increased or restricted so as to selectively regulate this water flow and regulate the total volume of water being admitted to the toilet, not shown, associated with this flush tank assembly, as well as aid in reducing the noise problems hereinbefore discussed.

A further problem well known in the art is that resulting from the flow of water through the refill hose 16 causing a tendency of this flexible refill hose to whip and thereby attempt to move relative to the overflow tube 22. In order to insure a complete resistance to this whipping tendency, in addition to the resilient pressure gripping between the hose engaging portion 30 and the refill hose 16, the lower extremity of the hose engaging portion is flared outwardly adjacent the slot 36 so as to provide the laterally or circumferentially spaced, outwardly flared detents or prong-like corners 38. As can be clearly seen in FIGS. 2 and 3, these detents 38, particularly in view of the pressure engagement of the hose 16 telescoped over the hose engaging portion 30 and the resilient material formation of the hose, will securely engage the hose extremity 26 so as to increase the overall frictional engagement therewth.

As before stated, the overflow tube mounting portion 32 is formed integral with the hose engaging portion 30 and includes the interior part 40 received interiorly of the overflow tube upper extremity 20 and the exterior part 42 received exteriorly of this tube upper extremity. Interior part 40 is plate-like and has a somewhat winged transverse cross section throughout the major portion of the length thereof so as to provide the flared side tube abutment portions 44 angling toward the tube side wall 34 when this interior part 40 is received within the overflow tube 22. This configuration of the interior part 40 provides overall stiffness for this part and also presents the flared side tube abutment portions 44 for securely corner engaging the tube side wall 34.

The exterior part 42 is formed from the interior part 40, as shown in FIGS. 2 and 4, and extends angularly outwardly from the interior part, and then downwardly, and then angels inwardly and upwardly so as to provide an overall hook-shaped configuration having the inwardly projecting leg 46. When the tube mounting portion 32 is in free standing position, that is, not engaged with the overflow tube 22, this inwardly projecting leg 46 of the exterior part 42 projects inwardly into the slot 48, remaining centrally in the interior part 40 by the removal therefrom of the integral exterior part 42. Furthermore, the inner extremity or inner edge 50 of this inwardly projecting leg 46 is formed bifurcated so as to present the inwardly projecting laterally spaced engagement dogs 52.

The tube mounting portion 32 is shown free standing in FIG. 4 and engaged over the upper extremity 20 of the overflow tube 22 in FIG. 2, and in view of the fact that the refill hose mounting clip 24 is formed of a somewhat resilient material, such as stainless steel, and relatively thin, when the tube mounting portion is engaged over the overflow tube, the exterior part 42 will flex outwardly relative to the interior part 40 so that the interior part is received interiorly of the tube and the exterior part is received exteriorly of the tube. Due to the upward angling of the inwardly projecting leg 46 of the exterior part, there is no problem with the exterior part 42 being forced to flex outwardly while the interior part 40 is being received inwardly of the tube 22 when this tube mounting portion 32 is forced downwardly over the tube upper extremity 20. Also, due to the particular hook-shaped configuration of the exterior part 42, this exterior part forms a stop against the edge of overflow tube 22 when in full engagement therewith, as shown in FIG. 2, and when fully engaged with the overflow tube as shown, the exterior part engagement dogs 52 are urged resiliently against the arcuate periphery or outer surface of the overflow tube 22 due to the spaced formation thereof, while at the same time, the interor part abutment portions 44 are forced to corner engage the arcuate inner surface of tube 22.

Thus, with the refill hose mounting clip 24 shown and described, this dual secure interior and exterior engagement by the interior part abutment portions 44 and the exterior part engagement dogs 52 resiliently forced into engagement with the overflow tube 22 will securely retain the refill hose 16 in proper position relative to the refill tube 22. Also, the pressure engagement of the hose engaging portion 30 internally of the refill hose 16, along with the increased engagement of the detents 38 of this hose engaging portion with the refill hose, will further insure this proper positioning, with both overcoming any tendency of the refill hose to whip and dislodge the hose from proper engagement with the overflow tube as a result of water flowing therethrough. Still further, the hollow cylindrical configuration of the hose engaging portion 30 received within the outlet extremity 26 of refill hose 16 will maintain this hose outlet or discharge extremity distended at all times to positively prevent the collapse of this hose extremity, while at the same time, the provision of the slot 36 in the hose engaging portion 30 permits the selected changing of the hose engaging portion outer dimensions so as to change the inner dimensions of the hose outlet extremity 26 and selectively control the flow of water therethrough, with this flow of water being directed angularly toward the overflow tube side wall 34 as a result of angling between the hose engaging and tube mounting portions 30 and 32.

With the secure retention of the refill hose 16 on the overflow tube 22 by the refill hose mounting clip 24, as described, the operation of the flush tank assembly shown in FIG. 1 is conventional. The water is drained from the flush tank 10 to flush the toilet, not shown, thereby dropping the float 54 of ball cock 14 and opening the valve 56 to admit water to the flush tank, and at the same time flow water through the refill hose 16. The flow of water from the refill hose 16 is directed into the overflow tube 22 for refilling the toilet trap, not shown, while the flush tank is ultimately refilled and the upward movement of the ball cock float 54 recloses the valve 56.

We claim:

1. In the combination of a hose mounting clip securing an extremity of a refill hose in operative relationship with the associated extremity of an overflow tube of a toilet flush tank: said resilient refill hose having a tubular extremity with a normal interior diameter; said rigid upstanding overflow tube having a tubular upper extremity; said hose mounting clip including a body having a tube mounting portion and a hose engaging portion, said tube mounting portion engaging said refill tube and retaining said hose engaging portion oriented with respect to said tube upper extremity, said hose engaging portion being disposed within the interior of said hose extremity, said hose engaging portion being of greater dimension than said normal interior diameter of said hose to expand said hose extremity and provide for frictional engagement of said hose interior by said hose engaging portion; and said clip hose engaging portion including a hollow cylindrical part having a slot formed axially therethrough, said cylindrical part being disposed within said hose interior and having a selected outer diameter greater than said hose interior diameter providing said hose extremity expansion, said selection of said cylindrical part outer diameter determining said hose expanded interior diameter.

2. The combination as defined in claim 1 in which said clip hose engaging portion includes prong means formed thereon for engaging said hose interior.

3. The combination as defined in claim 1 in which said clip hose engaging portion includes said cylindrical part being flared outwardly adjacent the lower extremity of said slot forming outwardly projecting prong-like corners engaged with said hose interior.

4. In the combination of hose mounting clip securing an extremity of a refill hose in operative relationship with the associated extremity of an overflow tube of a toilet flush tank: a resilient refill hose having a tubular extremity with a normal interior diameter; a rigid upstanding overflow tube having a tubular upper end; and a hose mounting clip including a body having a tube mounting portion and a hose engaging portion, said tube mounting portion being engaged over said upper end of said tube and having an interior part disposed against the interior of said tube and an exterior part disposed along the exterior of said tube, said exterior part having inwardly projecting spaced dogs formed thereon engaged with said tube exterior, and said hose engaging portion retaining the extremity of said hose oriented relative to said tube upper end.

5. The combination as defined in claim 4 in which said exterior part of said clip tube mounting portion is hook-shaped terminating in an inwardly projecting leg, said leg having a bifurcated end surface forming laterally spaced dogs engaged with said tube exterior.

6. The combination as defined in claim 4 in which said clip hose engaging portion includes a cylindrical part having a slot formed axially therethrough, said cylindrical part being inserted within the interior of said hose extremity, said cylindrical part being of greater diameter than said normal interior diameter of said hose to expand said hose extremity and provide for frictional engagement of said hose interior by said cylindrical part.

7. The combination as defined in claim 4 in which said exterior part of said clip tube mounting portion is hook-shaped terminating downwardly in an inwardly projecting leg, said leg having a bifurcated end surface forming laterally spaced dogs engaged with said tube exterior; and in which said clip hose engaging portion includes a cylindrical part having a slot formed axially therethrough, said cylindrical part being disposed within the interior of said hose extremity, said cylindrical part being of slightly greater dimension than said normal interior diameter of said hose to expand said hose extremity and provide for frictional engagement of said hose interior by said cylindrical part, said cylindrical part being flared outwardly adjacent the lower extremity of said slot forming outwardly projecting prong-like corners engaged with said hose interior.

References Cited by the Examiner

UNITED STATES PATENTS

| | | | |
|---|---|---|---|
| 1,162,075 | 11/1915 | Kirkpatrick | 248—79 X |
| 1,493,498 | 5/1924 | Pluym | 248—79 |
| 2,070,495 | 2/1937 | Strutz et al. | 248—79 X |
| 2,157,020 | 5/1939 | Sanford | 211—123 |
| 2,787,005 | 4/1957 | Zinkil. | |
| 2,918,244 | 12/1959 | Laney | 248—214 |
| 2,966,320 | 12/1960 | Schoepe et al. | 248—75 |
| 3,082,623 | 3/1963 | Bosland | 248—75 X |
| 3,108,828 | 10/1963 | Kus | 248—230 X |

CLAUDE A. LE ROY, *Primary Examiner.*